US00RE35418E

United States Patent [19]

Martignago

[11] E Patent Number: Re. 35,418

[45] Reissued Date of Patent: Jan. 7, 1997

[54] SECURING DEVICE, PARTICULARLY FOR FOOTWEAR

[76] Inventor: Dino Martignago, Via Bassananese 31, 31010 Maser, Italy

[21] Appl. No.: 361,828

[22] Filed: Dec. 22, 1994

Related U.S. Patent Documents

Reissue of:

[64] Patent No.: 5,172,454
Issued: Dec. 22, 1992
Appl. No.: 793,883
Filed: Nov. 18, 1991

[51] Int. Cl.[6] ..... A43C 11/00

[52] U.S. Cl. ..... 24/68 SK; 24/69 SK; 24/71 SK

[58] Field of Search ..... 24/68 SK, 68 CT, 24/69 SK, 70 SK, 71 SK; 36/5.1

[56] References Cited

U.S. PATENT DOCUMENTS

| | | | |
|---|---|---|---|
| 4,112,557 | 9/1978 | Salomon | 24/69 SK |
| 4,193,171 | 3/1980 | Lichowsky | 24/68 SK |
| 4,395,801 | 8/1983 | Gabrielli | 36/50.1 |
| 4,541,147 | 9/1985 | Olivieri | 24/69 SK |
| 4,546,521 | 10/1985 | Ribarits | 24/69 SK |
| 4,683,620 | 8/1987 | Valsecchi et al. | 24/68 SK |

*Primary Examiner*—Victor N. Sakran
*Attorney, Agent, or Firm*—Hoffman, Wasson & Gitler

[57] ABSTRACT

The device includes a base which is rigidly connectable with a first flap of an item of footwear; a pair of shoulders protrude from the base for the pivoting of a lever arm which is provided with a pivot for a support provided with a rachet system for engagement with a toothed tab. The support and the lever arm have first and second longitudinal slots which accomodate the pivot, which interacts selectively with seats defined on the shoulders. The tab is furthermore removably connectable with a second flap of the item of footwear. The device allows to achieve a rapid and easy securing and release of the first and second flaps and has a considerable safety during closure, which makes it free from accidental openings due for example to the contact of the lever arm with the ground.

5 Claims, 2 Drawing Sheets

SECURING DEVICE, PARTICULARLY FOR FOOTWEAR

Matter enclosed in heavy brackets [ ] appears in the original patent but forms no part of this reissue specification; matter printed in italics indicates the additions made by reissue.

BACKGROUND OF THE INVENTION

The invention relates to a securing device particularly usable for footwear such as for example sports footwear for hockey, cycling, motorcycling and skiing.

It is currently known to use, for such footwear, securing levers associated with a flap, which allow for example to tense a toothed band which is rigidly associated with the other flap to be joined.

The problems which arise in the execution of these devices essentially consist of the need to perform an optimum tensing of the band and a rapid and easy release thereof.

As a partial solution to these problems, the Italian patent application no. 61949 B/78, filed on Dec. 15, 1978, is known; said application relates to a lever closure device for ski boots which essentially comprises a lever which is rigidly associated with a flap of the upper and a substantially rigid toothed strap for connection between the flaps, which is tensed by the lever.

The peculiarity of this device consists of the fact that the strap is rigidly associated, at one end, with a flap of the upper and engages a ratchet stop system which is articulated to the closure lever.

Although said device is undoubtedly valid, it has some disadvantages: first of all, actuation of the ratchet system is possible only once the lever has been opened, thus forcing the user to exert a considerable effort in order to overcome the degree of securing set on the toothed strap.

Secondly, it has been observed that accidental impacts of the free end of the lever, for example at the snow or at the ground, lead to accidental openings of said lever and thus to slackenings of the toothed strap, with consequent release of the flaps.

SUMMARY OF THE INVENTION

The aim of the present invention is therefore to eliminate the disadvantages described above in known types by providing a device which allows to achieve the rapid and easy securing and release of the flaps of an item of footwear.

Within the scope of the above aim, an important object is to provide a device which allows, if a toothed strap is used, tile optimum association of said strap with one of the flaps to be joined.

Another important object is to provide a securing device which is not subject to accidental openings due to contacts of a lever arm with objects such as the ground or the snow.

Another important object is to provide a device which allows to optimally and easily adjust the degree of mutual securing of the flaps of an item of footwear according to the type of item.

Another important object is to provide a device which is structurally simple and easy to industrialize.

Not least object is to provide a device which is reliable and safe in use and has modest manufacturing costs.

This aim, these objects and others which will become apparent hereinafter are achieved by a device for securing a first flap and a second flap of an item of footwear, as defined in the appended claims.

BRIEF DESCRIPTION OF THE DRAWINGS

Further characteristics and advantages or the invention will become apparent from the detailed description of a particular embodiment, illustrated only by way of non-limitative example in the accompanying drawings, wherein.

DESCRIPTION OF THE PREFERRED EMBODIMENTS

Figure 1:
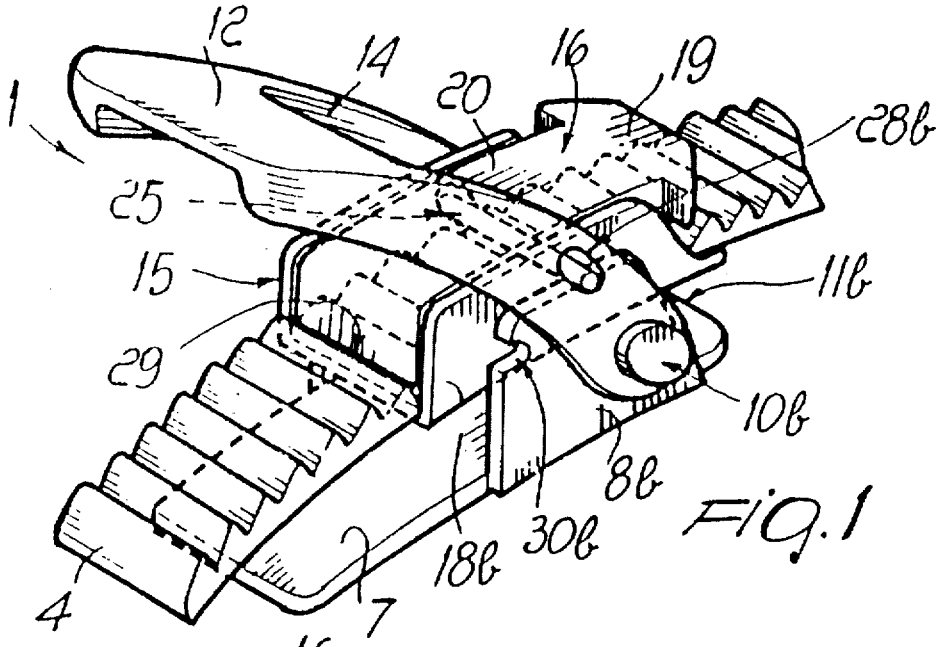
FIG. 1 is a perspective view of the securing device according to the present invention.
Figure 2:
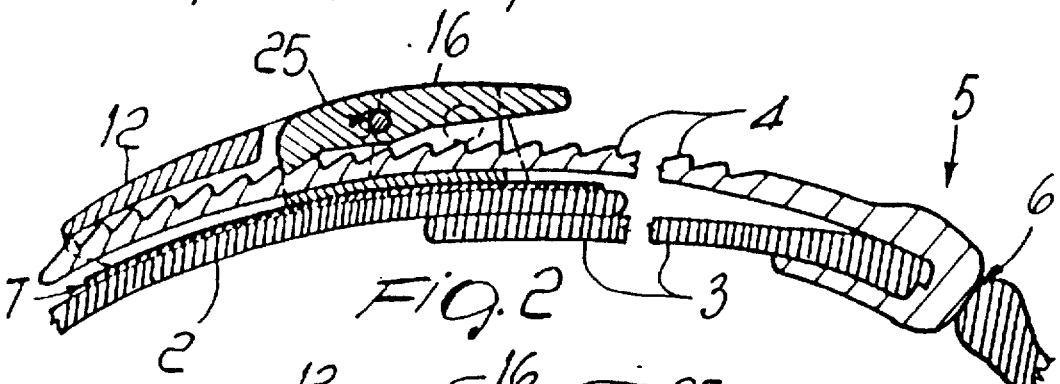
FIG. 2 is a sectional view of the device during closure, taken along the median longitudinal sectional plane.
Figure 3:
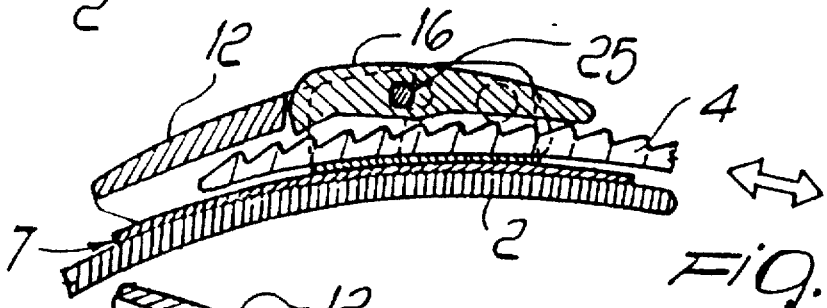
FIG. 3 is a sectional view of the device during partial opening, taken along the median longitudinal sectional plane.
Figure 4:
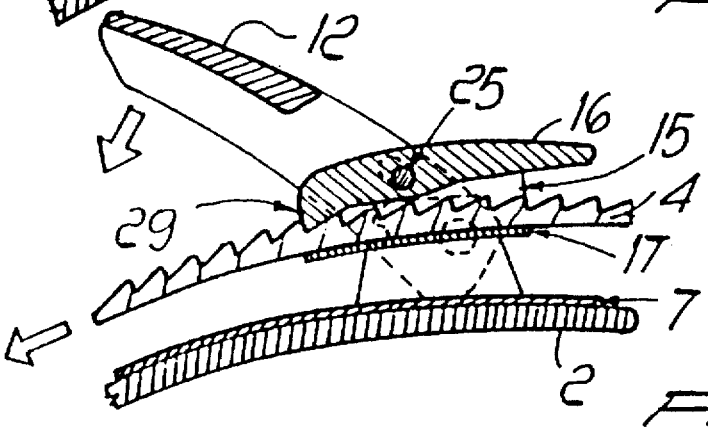
FIG. 4 is a sectional view of the device during opening, taken along median longitudinal sectional plane.
Figure 5:
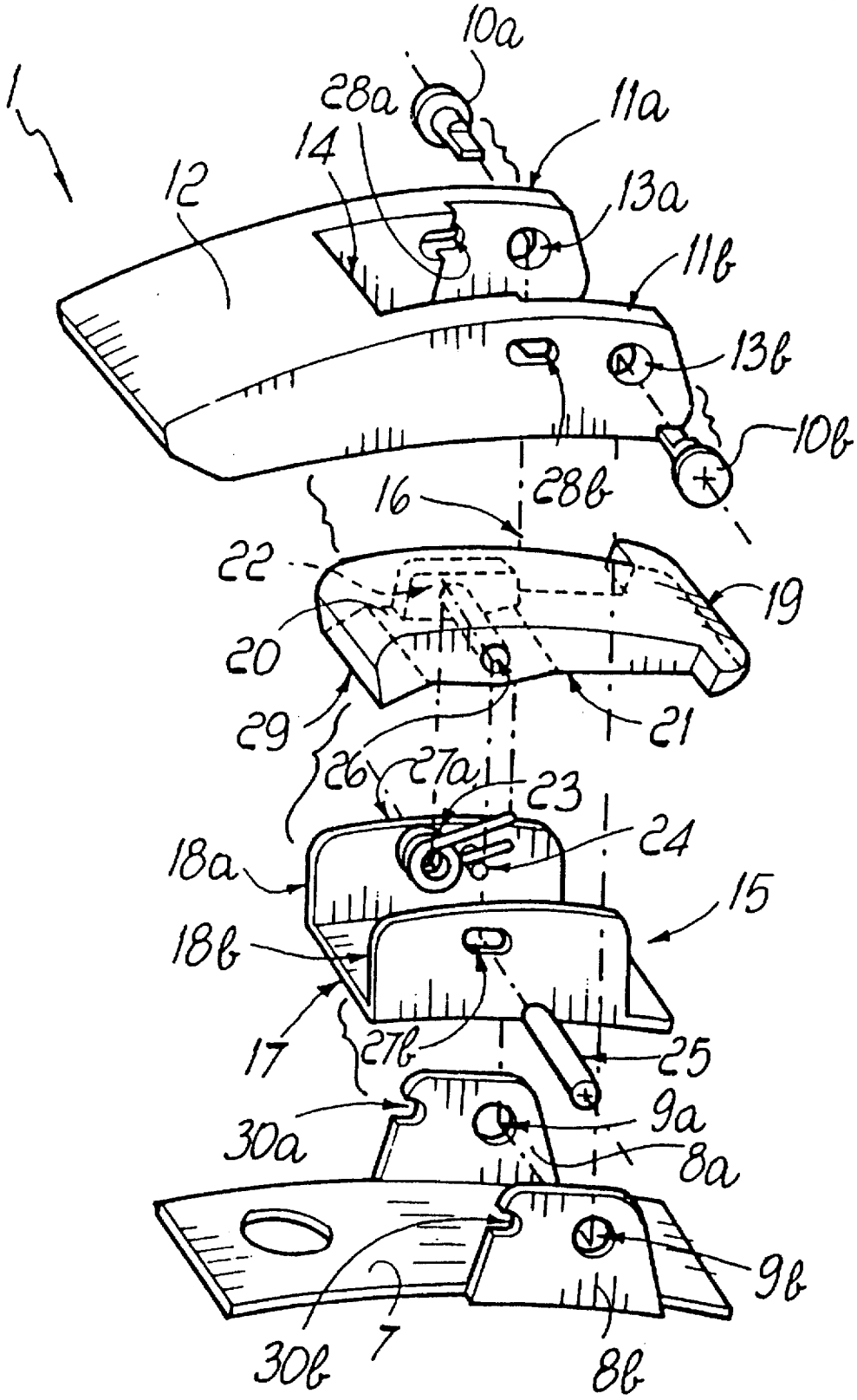
FIG. 5 is an exploded perspective view of the device showing its components.

With reference to the above figures, the securing device, generally indicated by the reference numeral 1, is particularly usable for securing a first flap and a second flap, indicated by the numerals 2 and 3, of an item of sports footwear, for example for playing hockey, for cycling, motorcycling and skiing.

Said securing device 1 comprises a toothed tab 4 which is removably associable, at an end 5 thereof, in a recess 6 defined on the second flap 3 of the upper.

Said securing device 1 further comprises a first base 7, which preferably has a rectangular shape and which is rigidly associable, by means of through screws or rivets, with the first flap 2.

A pair of shoulders 8a and 8b protrudes from said first base 7 at the longitudinal sides thereof; the shoulders have a first pair of holes 9a and 9b which have the same axis, and a pair of pivots 10a and 10b are provided in the holes 9a and 9b for pivoting the tabs 11a and 11b which protrude from a lever arm 12 to the first base 7. Said pair of pivots 10a and 10b also affect a second pair of holes 13a and 13b, both of which are defined at the same axis on the pair of tabs 11a and 11b of the lever arm A recess 14 is defined between the pair of tabs 11a and 11b and acts as seat for the temporary placement of a support 15 provided with a ratchet system 16.

The support 15 is U-shaped and defines a second base 17 from which a pair of walls 18a and 18b protrudes laterally.

Said particular U-shaped configuration allows to accommodate the ratchet system 16 between the walls 18a and 18b.

Said ratchet system has a T-shaped body constituted by a head 19 and a stem 20.

The head 19 protrudes from the lever arm 12 rearward with respect to the recess 14 and laterally with respect to the pair of tabs 11a and 11b.

A recess 22 is provided in the lower surface 21 of the stem 20 of the ratchet system, which is directed toward the second base 17; said recess acts as a seat for accommodating an elastic biasing element 23 constituted by a spring.

Said spring has an end which rests on a lug 24 which protrudes laterally and inside the wall 18a.

Said spring is arranged coaxially to a pivot 25 which is arranged inside a hole 26 defined transversely to the stem 20; said pivot 25 also affects a first pair of slots 27a, 27b and a second pair of slots 28a, 28b which are defined longitudinally to the pair of walls 18a and 18b and to the pair of tabs 11a and 11b respectively.

The tab 4 can be inserted between the second base 17 of the support 15 and the ratchet system 16 and is provided with a plurality of teeth which are engaged ratchet-like by the end 29 of the ratchet system 16 which is opposite to the lead 19.

The ends of the pivot 25 selectively interact with stop means 30a and 30b which are defined on the perimetric edge of the pair of shoulders 8a and 8b of the first base 7 which is directed opposite to the head 19 of the ratchet system 16.

The operation of the above described device is as follows: when the item of footwear is used for the first time, the toothed tab 4 is disengaged from the ratchet system 16, thus allowing both the first flap 2 and the second flap 3 to remain spaced with no limitations at all.

Subsequently, the user, once he has put his foot in the item of footwear, causes the toothed end of the tab 4 to interact with the ratchet system 16, pushing said toothed tab until a first securing of the first and second flaps is achieved; in this condition, the lever arm 12 is in a passive condition, i.e. it is open.

The user then actuates the lever arm 12, subjecting the toothed tab 4 to traction to close the item of footwear.

Advantageously, in order to further adjust the securing action, it is possible to actuate the ratchet system 16, by pressing on the head 19 thereof, so as to allow the sliding of tile toothed tab 4, leaving the lever arm in closed condition.

This operation is thus allowed by virtue of the particular articulation of the ratchet system, which is independent of the closed or open condition of the lever arm 12.

The angular position of the lever arm 12 thus does not limit the possibility of varying the degree of securing of the flaps of tile item of footwear.

The same operation can obviously be repeated on the other levers one or more times, achieving, as a whole, the required degree of closure of the item of footwear.

The securing device is furthermore safe in use, since it is not subject to accidental openings due to hypothetical contacts of a lever arm with the ground or with the snow: the ends of the pivot 25 are in fact locked, during the closure of the lever arm 12, at the stop means 30a and 30b.

In order to open the item of footwear and allow the user to remove his foot therefrom, before opening the lever arm 12, it is necessary to impart a longitudinal translatory motion to said lever arm, for example by exerting pressure in this direction on the toothed tab or on the ratchet system, so as to disengage the ends of the pivot 25 from the sop means 30a and 30b defined on the perimetric edge of the pair of shoulders 8a and 8b of the first base 7.

This is furthermore allowed by virtue of the presence of the first and second slot pairs 27a, 27b and 28a, 28b defined longitudinally to the pair of walls 18a and 18b and to the pair of tabs 11a and 11b respectively.

It is then possible to raise the lever arm 12, achieving a partial release of the flaps, the ratchet system remaining connected to the toothed tab.

Alternatively, the flaps can be released by acting on the head 19 of the ratchet system 16, complete opening being achieved since the toothed tab disengages from the end 29 of the ratchet system.

It has thus been observed hat the invention has achieved the above aim and objects, a device having been provided which allows the rapid and easy securing and release of the flaps of an item of footwear.

The toothed strip used, by virtue of its temporary connection to a flap of the upper, can be easily replaced for example in case of wear or breakage.

The presence of the stop means 30a and 30b which selectively interact with the ends of the pivot 25 allows to provide a securing device which is not subject to accidental openings due to hypothetical contacts of the lever arm with the ground or with the snow.

The materials and dimensions of the individual elements which constitute the device may naturally be the most appropriate according to the specific requirements.

I claim:

1. Device for securing a first flap and a second flap of an item of footwear, comprising a first base rigidly associable with said first flap, a pair of pivoting shoulders protruding from said first base and having pivotally connected thereto a lever arm, said lever arm having a pivot connected to a support provided with a ratchet system for engagement with a toothed tab, said support having a first longitudinal slot, said lever arm having a second longitudinal slot, said first longitudinal slot and said second longitudinal slot accommodating said pivot, said pivot selectively interacting with stop means, said stop means being defined on said shoulders, said toothed tab being removably associable with said second flap, said lever arm being provided with a pair of tabs defining a seat for the temporary positioning of said support provided with a ratchet system, said support being U-shaped and defining a second base, a pair of walls for accommodating said ratchet system protruding laterally from said second base, said ratchet system having a T-shaped body constituted by a head and a stem, said head protruding rearward and laterally with respect to said pair of tabs, said stem having a free end, said free end of said stem interacting with said toothed tab and being directed in the same direction as the free end of said lever arm.

2. Device according to claim 1, wherein said pivot is arranged at a hole, a first pair of slots and a second pair of slots, said hole being defined transversely to said stem of said ratchet system, said first pair of slots being defined longitudinally to said pair of walls of said support, said second pair of slots being defined longitudinally to said pair of tabs of said lever arm.

3. Device according to claim 1, wherein the ends of said pivot selectively interact with stop means, said stop means being constituted by recesses, said recesses being defined on a perimetric edge of said pair of shoulders of said first base which is directed opposite to said head of said ratchet system.

*4. Device for securing a first flap and a second flap of an item of footwear, comprising a first base rigidly associable with said first flap, a pair of pivoting shoulders protruding from said first base and having pivotally connected thereto a lever arm, said lever arm having a pivot connected to a support provided with a ratchet system for engagement with a toothed tab, said support having a first slot, said lever having a second longitudinal slot, said first slot and said second longitudinal slot accommodating said pivot, said pivot selectively interacting with stop means, said stop means being defined on said shoulders, said toothed tab being removably associable with said second flap, said lever arm being provided with a pair of tabs defining a seat for the*

*temporary positioning of said support provided with a ratchet system, said support being U-shaped and defining a second base, a pair of walls for accommodating said ratchet system protruding laterally from said second base, said ratchet system having a T-shaped body including a head and a steam, said head protruding rearward and laterally with respect to said pair of tabs, said stem having a free end, said free end of said stem interacting with said toothed tab and being directed in the same direction as the free end of said lever arm.*

*5. Device for securing a first flap and a second flap of an item of footwear, comprising a first base rigidly associable with said first flap, a pair of pivoting shoulders protruding from said first base and having pivotally connected thereto a lever arm, said lever arm having a pivot connected to a support provided with a ratchet system for engagement with a toothed tab, said support having a first longitudinal slot, said lever having a second longitudinal slot, said first longitudinal slot and said second longitudinal slot accommodating said pivot, said pivot selectively interacting with stop means, said stop means being defined on said shoulders, said toothed tab being removably associable with said second flap, said lever arm being provided with a pair of tabs defining a seat for the temporary positioning of said support provided with a ratchet system, said walls for accommodating said ratchet system protruding laterally from said second base, said ratchet system having a T-shaped body including a head and a stem, said head protruding rearward and laterally with respect to said pair of tabs, said stem having a free end, said free end of said stem interacting with said toothed tab and being directed in the same direction as the free end of said lever arm.*

* * * * *